US011945329B2

(12) United States Patent
Shpati et al.

(10) Patent No.: US 11,945,329 B2
(45) Date of Patent: Apr. 2, 2024

(54) INTELLIGENT VEHICLE SYSTEMS AND CONTROL LOGIC FOR BATTERY CHARGE CONTROL AND INFORMATION DISPLAY

(71) Applicant: GM GLOBAL TECHNOLOGY OPERATIONS LLC, Detroit, MI (US)

(72) Inventors: John Shpati, Royal Oak, MI (US); Jeeho J. Cha, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/734,225

(22) Filed: May 2, 2022

(65) Prior Publication Data
US 2023/0347777 A1 Nov. 2, 2023

(51) Int. Cl.
*B60L 58/12* (2019.01)
*B60L 53/66* (2019.01)
*B60Q 1/50* (2006.01)
*B60Q 5/00* (2006.01)
*H04W 4/021* (2018.01)

(52) U.S. Cl.
CPC ............ *B60L 53/66* (2019.02); *B60L 58/12* (2019.02); *B60Q 1/50* (2013.01); *B60Q 5/005* (2013.01); *H04W 4/022* (2013.01); *B60L 2240/622* (2013.01)

(58) Field of Classification Search
CPC .... B60L 53/66; B60L 58/12; B60L 2240/622; B60Q 1/50; B60Q 5/005; H04W 4/022
See application file for complete search history.

(56) References Cited

U.S. PATENT DOCUMENTS

| | | | |
|---|---|---|---|
| 5,642,270 A | 6/1997 | Green et al. | |
| 6,275,004 B1 | 8/2001 | Tamai et al. | |
| 7,810,476 B2 | 10/2010 | Wang et al. | |
| 8,091,416 B2 | 1/2012 | Wang et al. | |
| 8,201,444 B2 | 6/2012 | Wang et al. | |
| 8,276,373 B2 | 10/2012 | Wang et al. | |
| 8,565,949 B2 | 10/2013 | Christman et al. | |
| 9,058,578 B2 | 6/2015 | Jones et al. | |
| 9,142,980 B2 | 9/2015 | Lee | |
| 9,660,462 B2 | 5/2017 | Jeon | |
| 9,718,371 B2 | 8/2017 | Anglin et al. | |
| 9,834,114 B2 * | 12/2017 | Hettrich | B60L 58/27 |

(Continued)

*Primary Examiner* — Gonzalo Laguarda
(74) *Attorney, Agent, or Firm* — Quinn IP Law

(57) ABSTRACT

Presented are intelligent vehicle systems and logic for battery charge control and information display, methods for making/using such systems, and vehicles equipped with such systems. A method of operating a vehicle includes a vehicle controller receiving vehicle location data indicating a real-time location of the vehicle and determining if the vehicle's real-time location is within a virtual geofence that delineates a predefined geographic area. If the real-time vehicle location is within the virtual geofence, the controller receives user location data indicating a real-time location of a vehicle user and determines if the user's real-time location is within a predefined proximity to the vehicle. If the user is within the predefined proximity to the vehicle, the controller responsively determines if a vehicle battery is charging; if so, the controller transmits a command signal to a resident vehicle subsystem to execute a control operation related to the charging of the vehicle battery.

20 Claims, 2 Drawing Sheets

(56) References Cited

U.S. PATENT DOCUMENTS

| | | | |
|---|---|---|---|
| 10,688,881 B2 | 6/2020 | Tarnowsky et al. | |
| 10,875,406 B2* | 12/2020 | Galin | B60L 53/57 |
| 10,906,425 B2* | 2/2021 | Herman | B60L 53/68 |
| 11,072,389 B2* | 7/2021 | Doerksen | B62J 43/16 |
| 11,173,805 B2* | 11/2021 | Zendler | B60Q 1/44 |
| 2008/0051973 A1 | 2/2008 | Gangopadhyay et al. | |
| 2008/0265835 A1 | 10/2008 | Reed et al. | |
| 2008/0284385 A1 | 11/2008 | Namuduri et al. | |
| 2009/0030712 A1 | 1/2009 | Bogolea et al. | |
| 2010/0198754 A1 | 8/2010 | Jones et al. | |
| 2011/0101698 A1 | 5/2011 | Saluccio | |
| 2011/0215767 A1 | 9/2011 | Johnson et al. | |
| 2011/0248675 A1 | 10/2011 | Shiu et al. | |
| 2012/0085082 A1 | 4/2012 | Levijoki et al. | |
| 2012/0181854 A1 | 7/2012 | Gopalakrishnan et al. | |
| 2012/0181953 A1 | 7/2012 | Hsu et al. | |
| 2012/0206296 A1 | 8/2012 | Wan | |
| 2012/0286063 A1 | 11/2012 | Wang et al. | |
| 2013/0024035 A1 | 1/2013 | Akira et al. | |
| 2013/0027048 A1 | 1/2013 | Schwarz et al. | |
| 2013/0038279 A1 | 2/2013 | Seyerle et al. | |
| 2013/0113413 A1 | 5/2013 | Harty | |
| 2013/0119935 A1 | 5/2013 | Sufrin-Disler et al. | |
| 2014/0197776 A1 | 7/2014 | Schlaupitz et al. | |
| 2016/0052450 A1 | 2/2016 | Chan et al. | |
| 2016/0285296 A1 | 9/2016 | Namou et al. | |
| 2017/0307390 A1 | 10/2017 | Uyeki | |

* cited by examiner

INTELLIGENT VEHICLE SYSTEMS AND CONTROL LOGIC FOR BATTERY CHARGE CONTROL AND INFORMATION DISPLAY

INTRODUCTION

The present disclosure relates generally to rechargeable energy storage systems of motor vehicles. More specifically, aspects of this disclosure relate to intelligent vehicle systems and methods for battery pack charge control of electric-drive automobiles.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

A full-electric vehicle (FEV)—colloquially labeled an "electric car"—is a type of electric-drive vehicle configuration that altogether omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with a single or multiple traction motors, a traction battery pack, and battery cooling and charging hardware in a battery-based FEV. Hybrid-electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

High-voltage (HV) electrical systems govern the transfer of electricity between the traction motor(s) and the rechargeable energy storage system that supplies the requisite power for operating many hybrid-electric and full-electric powertrains. A modern traction battery pack, for example, group stacks of battery cells (e.g., 8-16+ cells/stack) into individual battery modules (e.g., 10-40+ modules/pack) that are electrically interconnected—in series or in parallel—via the HV electrical system to multi-phase traction motors for vehicle propulsion. Located on a battery side of the HV electric system is a front-end DC-to-DC power converter that is electrically connected to the traction battery pack(s) in order to increase the supply of voltage to a main DC bus and a DC-to-AC power inverter module (PIM). A high-frequency bulk capacitor may be arranged across the positive and negative terminals of the HV main DC bus to provide electrical stability and store supplemental electrical energy. A dedicated Electronic Battery Control Module (EBCM), through collaborative operation with a Powertrain Control Module (PCM) and each motor's power electronics package, governs operation of the battery pack(s) and traction motor(s).

As hybrid and electric vehicles become more prevalent, infrastructure is being developed and deployed to make day-to-day use of such vehicles feasible and convenient. Electric vehicle supply equipment (EVSE) for recharging vehicles comes in many forms, including residential electric vehicle charging stations (EVCS) purchased and operated by a vehicle owner (e.g., installed in the owner's garage). Other EVSE examples include publicly accessible EVCS made available by public utilities or private retailers (e.g., at municipal charging stations or commercial charging facilities), and sophisticated high-voltage, high-current charging stations used by manufacturers, dealers, and service stations. Plug-in hybrid and electric vehicles, for instance, can be recharged by physically connecting a charging cable of the EVCS to a complementary charging port of the vehicle. By comparison, wireless charging systems utilize electromagnetic field (EMF) induction or other wireless power transfer (WPT) technology to provide vehicle charging capabilities without the need for charging cables and cable ports. Many residential and publicly accessible EVCS do not provide operators with continuous and detailed status information during vehicle charging. Rather, the vehicle operator is oftentimes required to enter the vehicle, activate the vehicle's accessory mode or key-on the vehicle, and retrieve the charging status information through a series of prompts on a vehicle telematics unit.

SUMMARY

Presented herein are intelligent vehicle systems with attendant control logic for battery charge control and information display, methods for manufacturing and methods for operating such systems, and motor vehicles equipped with such systems. By way of example, there are disclosed systems and methods for monitoring a vehicle charging operation and selectively communicating charging information, such as charge status (e.g., active or inactive), charge type (e.g., bulk, trickle, maintenance, etc.), charge percentage (e.g., state of charge (SoC) or depth of discharge (DoD)), etc., to a vehicle operator. Information is automatically communicated to the operator when the vehicle is detected within a predefined "geofenced" location, such as the operator's garage, and the operator is detected within a predefined proximity to the vehicle, such as within an 8 to 10-meter (m) radius, for the operator to readily perceive the information. Any of an assortment of in-vehicle proximity sensors, range sensors, digital cameras, close-range communication devices, etc., may be employed to locate the operator or the operator's smartphone, key fob, etc. Automated presentment of battery charging information may be provided via display on a vehicle telematics unit, flashing of vehicle headlights/taillights, activation of a vehicle horn system, or acoustic output of a vehicle audio system. The intelligent vehicle system may also collect historical driving data to predict daily departure times and daily miles driven. Prior to an estimated departure time, the vehicle may alert the operator that ambient weather/temperature may affect their driving range and may provide the operator with an estimated time needed for battery preconditioning, e.g., using DC fast charging.

Attendant benefits for at least some of the disclosed concepts include intelligent vehicle systems and logic that provision automated vehicle charge monitoring, feedback, and control. At least some of the disclosed features eliminate the need for a vehicle operator to enter their vehicle, power-on the vehicle or vehicle telematics unit, and wait for the system to load, or access and navigate through a dedicated smartphone application in order to retrieve charge status information. Other attendant benefits may include enhanced vehicle operation, improved customer experience, and reduced range anxiety. In addition to improved charging capabilities and customer experience, disclosed concepts may help to increase driving range and battery pack performance for electric-drive vehicles.

Aspects of this disclosure are directed to intelligent vehicle systems, system control logic, and closed-loop feedback control techniques for monitoring, feedback, and control during vehicle battery charging operations. In an example, a method is presented for operating a motor vehicle with a rechargeable battery. This representative method includes, in any order and in any combination with any of the above and below disclosed options and features: receiving, e.g., via a resident or remote vehicle controller from one or more location detection devices, vehicle location data indicative of a real-time location of the host vehicle; determining, e.g., via the vehicle controller, if the vehicle's real-time location is wholly or partially within a virtual geofence that delineates a predefined geographic area; receiving, e.g., via the vehicle controller from one or more location sensing devices in response to the vehicle's real-time location being within the virtual geofence, user location data indicative of a real-time location of a user of the vehicle; determining, e.g., via the vehicle controller, if the user's real-time location is within a predefined proximity to the vehicle; determining, e.g., via the vehicle controller in response to the user's real-time location being within the predefined proximity to the vehicle, if the vehicle battery is actively charging; and transmitting, e.g., via the vehicle controller to one or more resident vehicle subsystems of the vehicle, one or more command signals to execute one or more control operations related to the charging of the vehicle battery.

Aspects of this disclosure are also directed to computer-readable media (CRM) for automated battery charge control and information display. In an example, a non-transitory CRM stores instructions executable by one or more processors of a resident or remote vehicle controller. These instructions, when executed by the processor(s), cause the controller to perform operations, including: receiving, from a location detection device, vehicle location data indicative of a real-time vehicle location of the vehicle; determining if the real-time vehicle location is within a virtual geofence delineating a predefined geographic area; receiving, from a location sensing device in response to the real-time vehicle location being within the virtual geofence, user location data indicative of a real-time user location of a user of the vehicle; determining if the real-time user location is within a predefined proximity to the vehicle; determining, in response to the real-time user location being within the predefined proximity to the vehicle, if the vehicle battery is charging; and transmitting, to a resident vehicle subsystem of the vehicle, a command signal to execute a control operation related to the charging of the vehicle battery.

Additional aspects of this disclosure are directed to intelligent motor vehicles with automated battery pack charge control and feedback capabilities. As used herein, the terms "vehicle" and "motor vehicle" may be used interchangeably and synonymously to include any relevant vehicle platform, such as passenger vehicles (ICE, REV, FEV, fuel cell, fully and partially autonomous, etc.), commercial vehicles, industrial vehicles, tracked vehicles, off-road and all-terrain vehicles (ATV), motorcycles, farm equipment, watercraft, aircraft, etc. In an example, an electric-drive vehicle includes a vehicle body with a passenger compartment, multiple road wheels mounted to the vehicle body (e.g., via corner modules coupled to a unibody or body-on-frame chassis), and other standard original equipment. One or more electric traction motors operate alone (e.g., for FEV powertrains), or in conjunction with an engine assembly (e.g., for HEV powertrains), to selectively drive one or more of the road wheels to propel the vehicle. A rechargeable energy storage system (RESS) contains one or more rechargeable battery packs mounted onto the vehicle body and electrically connected to the traction motor(s) for supplying electrical power thereto.

Continuing with the discussion of the preceding example, the vehicle includes a controller, control module, or network of controllers and/or modules (collectively "controller") that receive vehicle location data from one or more location detection devices indicating a real-time location of the motor vehicle, and then determine if the vehicle's real-time location is within a virtual geofence that delineates a predefined geographic area. If the vehicle's real-time location is within the virtual geofence, the controller receives user location data from one or more location sensing devices indicating a real-time location of a user of the vehicle, and then determines if the user's real-time location is within a predefined proximity to the vehicle. If so, the controller responsively verifies that the rechargeable battery pack is charging and then commands one or more resident vehicle subsystems to execute one or more control operations related to the charging of the traction battery pack(s).

For any of the disclosed systems, methods, and vehicles, the vehicle may be turned off in response to a vehicle stop input received from the user (e.g., via keying-off the vehicle, depressing a start/stop button, etc.). When the vehicle is turned off, the vehicle controller may be placed in a temporary sleep mode and periodically awaken according to a preset wake schedule to receive vehicle location data and determine if the vehicle's real-time location is within the virtual geofence. A virtual geofence may be defined by the user, the vehicle, and/or a third-party entity and saved in a resident or remote memory device. In this instance, the vehicle controller may retrieve the virtual geofence from the memory device for determining if the vehicle's real-time location is within the virtual geofence.

For any of the disclosed systems, methods, and vehicles, the vehicle controller may respond to a determination that the vehicle battery is not charging by determining if the battery has a low charge and/or if the vehicle is not properly connected to the charging station for carrying out the charging of the vehicle battery. If the vehicle battery has a low charge and/or the vehicle is not properly connected to the charging station, the vehicle controller may responsively transmit a first alert to the user indicating a negative charging status. Alternatively, the vehicle controller may respond to the vehicle battery not having a low charge while the vehicle is properly connected to the charging station by transmitting a second alert to the user indicating a positive charging status.

For any of the disclosed systems, methods, and vehicles, a designated controller may estimate a predicted departure time for the vehicle (e.g., based on predictive modeling or machine learning from historical driving data) and a predicted battery performance impact on the vehicle battery for ambient driving conditions (e.g., cold weather vs. hot weather, short trip vs. long trip, battery temp, battery SoC, etc.). The controller may transmit one or more charge signals to a resident battery charging system to precondition the vehicle battery based on the predicted departure time and the predicted battery performance impact. Prior to preconditioning the battery, the vehicle controller may transmit one or more alerts to the user of the vehicle that preconditioning of the vehicle battery is recommended, and receive a user input selecting/approving battery preconditioning.

For any of the disclosed systems, methods, and vehicles, the user may be carrying a key fob and/or a wireless-enabled portable electronic device. In this instance, the location sensing device may include an in-vehicle fob transceiver and/or a short-range communication device that communicates with the key fob or portable electronic device to derive the user's real-time location/proximity. Optionally, the location sensing device may include an in-vehicle range sensor (e.g., RADAR), detection sensor (e.g., LiDAR or ultrasonic sensor), and/or image sensor (e.g., digital camera) mounted to the vehicle. In this instance, the user location data may include user presence, distance, proximity, and/or type information. As yet another option, the vehicle location detection device may include a Global Positioning System (GPS) transceiver, and the vehicle location data may include GPS geolocation data. Alternatively, real-time vehicle and user location information may be retrieved from the charging station (e.g., plug sensor or proximity sensor), the designated geofenced area (e.g., in-home security cameras, proximity sensors, WiFi, etc.), cellular trilateration techniques, and/or the previously discussed in-vehicle sensor(s).

For any of the disclosed systems, methods, and vehicles, the resident vehicle subsystem may include a center-stack telematics unit with a touchscreen display device that is mounted inside the vehicle's passenger compartment. In this instance, the control operation may include the telematics unit display device automatically displaying a charge status, a charge type, and/or a charge percentage of the battery contemporaneous with charging of the vehicle battery. Optionally, the resident vehicle subsystem may include the vehicle's horn system and/or lighting system. In this example, the control operation may include the vehicle controller automating activation of the vehicle horn/lighting system to output a predefined beep/flash output that indicates the charging of the vehicle battery is/is not properly functioning (e.g., EVCS system fault, in-vehicle charging hardware fault, plug not connected, etc.). As yet another option, the resident vehicle subsystem may include an in-vehicle audio system with one or more speaker devices that are mounted inside the vehicle passenger compartment. In this instance, the control operation may be a speaker device outputting a charge status, a charge type, and/or a charge percentage of the vehicle battery contemporaneous with charging of the battery.

The above Summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

Figure 1:
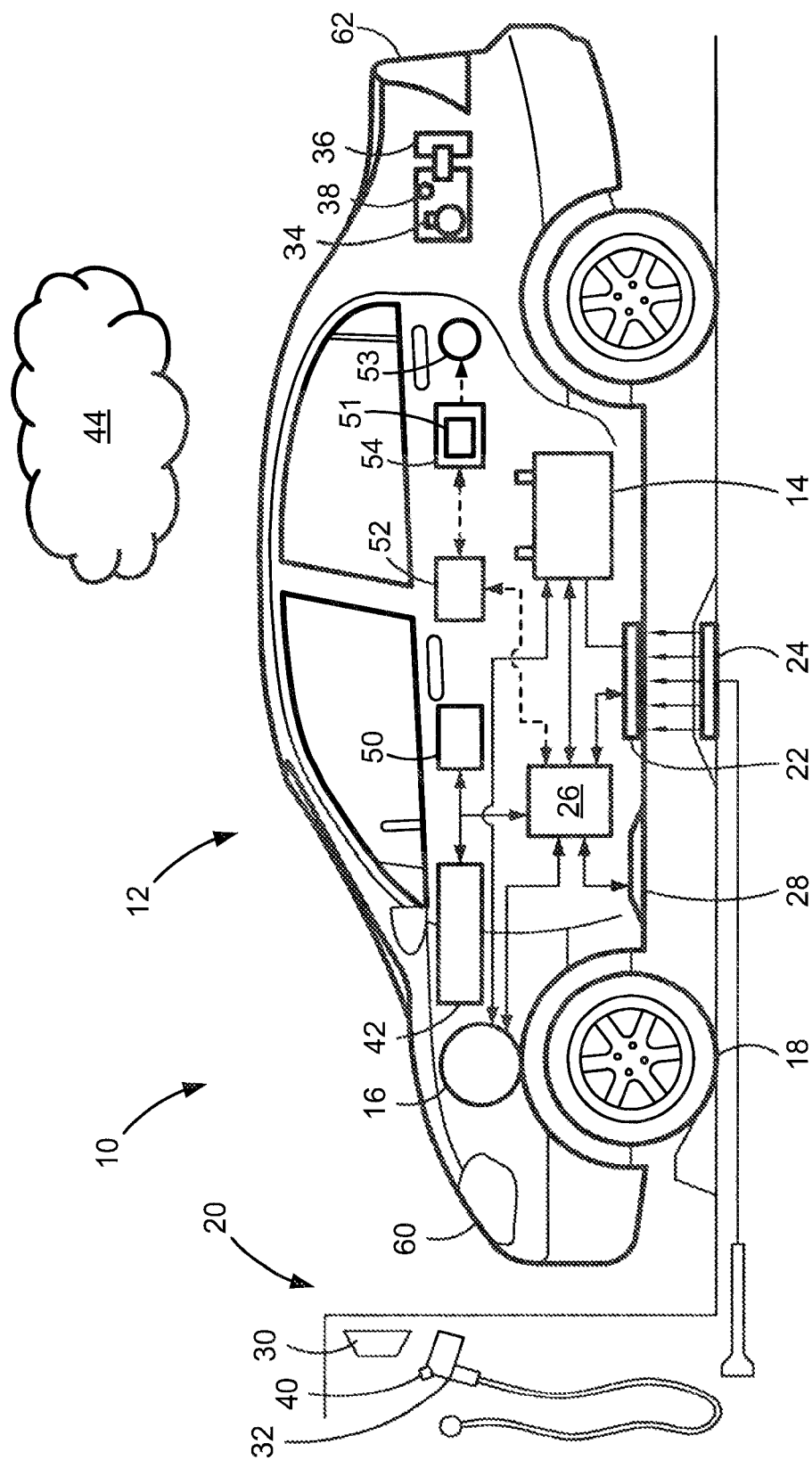
FIG. 1 is a partially schematic, side-view illustration of a representative motor vehicle with an electrified powertrain, a rechargeable energy storage system, and a network of in-vehicle controllers, sensing devices, and communication devices for battery charge monitoring, feedback, and control in accordance with aspects of the disclosed concepts.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, subcombinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative automobile, which is designated generally at 10 and portrayed herein for purposes of discussion as a sedan-style, plug-in battery electric vehicle (BEV). The illustrated automobile 10—also referred to herein as "motor vehicle" or "vehicle" for short—is merely an exemplary application with which novel aspects of this disclosure may be practiced. In the same vein, incorporation of the present concepts into an all-electric BEV powertrain should also be appreciated as a non-limiting implementation of disclosed features. As such, it will be understood that aspects and features of this disclosure may be applied to other electrified powertrain architectures, implemented for any logically relevant type of vehicle, and utilized for both automotive and non-automotive applications alike. Moreover, only select components of the motor vehicles and charging systems are shown and described in additional detail herein. Nevertheless, the vehicles and systems discussed below may include numerous additional and alternative features, and other available peripheral components, for carrying out the various methods and functions of this disclosure.

FIG. 1 is a simplified illustration of the electric-drive vehicle 10 docked at and operably coupled to a vehicle charging station 20 for recharging an onboard rechargeable energy storage system, such as a high-voltage, direct current (DC) traction battery pack 14. Traction battery pack 14 may take on many suitable configurations, including an array of stacked lithium-class battery cells, metal-class battery cells, or other applicable type of rechargeable electric battery cell. In a non-limiting example, battery pack 14 may be a deep-cycle, high-ampere capacity battery rated for approximately 200 to 800 VDC or more, for example, depending on a desired vehicle range, gross vehicle weight, and power ratings of the various accessory loads drawing from the vehicle's RESS. To this end, the vehicle RESS may employ a single or multiple high-voltage, high-energy-density battery packs that electrically connect to the vehicle's drive motors. A traction battery pack is generally composed of an array of lithium-ion rechargeable (secondary) battery modules. Each battery module may include a series of electrochemical battery cells, such as stacked pouch-type lithium ion (Li-ion) or Li-ion polymer battery cells, as a non-limiting example.

To provide an operable coupling between the traction battery pack 14 and vehicle charging station 20, the vehicle 10 may include an inductive charging component 22 with an integrated induction coil that is mounted to the underside of the vehicle body 12. This inductive charging component 22 serves as a wireless charging interface that is compatible with a wireless charging pad 24 with an internal EMF coil of the vehicle charging station 20. In the illustrated example, the wireless charging pad 24 is located on the floor of the charging station 20 and situated in accordance with a "target position" that serves as a desired parking location for purposes of efficient and effective wireless charging of the vehicle 10. In particular, FIG. 1 depicts the vehicle 10 parked in proper fore-aft alignment and in proper starboard-port alignment with the charging pad 24—aligned with the target position—to complete an inductive charging operation for the battery pack 14 that maximizes the percentage of power transmitted wirelessly between the two systems.

The vehicle charging station 20 (also referred to herein a "EVCS") may employ any heretofore and hereafter developed type of wired and wireless charging technology, including inductive charging, radio charging, capacitive charging, and resonance charging, as some non-limiting examples. In accordance with electromagnetic induction charging technology, the representative wireless charging pad 24 of FIG. 1 may be activated with electric current to generate an alternating electromagnetic field proximate the inductive charging component 22. This time-variant magnetic field, in turn, induces an electric current in the inductive charging component 22 of the vehicle 10. The induced current may be filtered, stepped-down, and/or phase-shifted by in-vehicle electrical modulation circuitry (e.g., a traction power inverter module (TPIM) 26) to charge the traction battery pack 14 or any other energy source of the vehicle 10 (e.g., a standard 12V lead-acid starting, lighting, and ignition (SLI) battery, an auxiliary power module, etc.).

Traction battery pack 14 stores energy that can be used for propulsion by one or more electric traction motors 16 and for operating other vehicle subsystems. The traction battery pack 14 is communicatively connected (wired or wirelessly) to one or more vehicle controllers, represented in FIG. 1 by electronic control unit (ECU) 42, that regulate operation of various onboard vehicle systems and components. Contactors controlled by the ECU 42, for example, may isolate the traction battery pack 14 from select components when opened, and connect the traction battery pack 14 to select components when closed. The ECU 42 is also communicatively connected to the electric traction motor(s) 16 to control, for instance, bi-directional transfer of energy between the traction battery pack 14 and each motor 16. For instance, traction battery pack 14 may provide a DC voltage while the motor(s) 16 may operate using a three-phase AC current; in such an instance, a TPIM 26 governed by ECU 42 converts the DC voltage to a three-phase AC current for use by the motors 16. In a regenerative mode, e.g., in which the traction motor 16 is configured as a motor-generator unit (MGU), the ECU-controlled TPIM 26 converts AC power from the motor-generator(s) 16 to DC power compatible with the traction battery pack 14. The representative ECU 42 is also shown communicating with charging component 22, for example, to condition the power supplied from the vehicle charging station 20 to the battery pack 14 to help ensure proper voltage and current levels.

Vehicle charging station 20 of FIG. 1 also offers wired charging for electric vehicle 10 via a "plug-in" electrical connector 32, which may be one of a number of different commercially available electrical connector types. By way of non-limiting example, electrical connector 32 may be a Society of Automotive Engineers (SAE) J1772 (Type 1) or J1772-2009 (Type 2) or International Electrotechnical Commission (IEC) 62196-2 and/or 62196-3 compatible electrical connector with single-phase or split-phase modes operating at 120 to 240 volts (V) with alternating current (AC) at up to 80 amperes (A) peak current for conductive charging. A charge port 34 accessible on the exterior of vehicle body 12 is a wired charging interface functioning as an electrical inlet into which electrical connector 32 may be plugged or otherwise mated. Charge port 34 of FIG. 1 is not limited to any particular design, and may be any type of inlet, port, connection, socket, plug, etc., that enables conductive or other types of electrical connections. A hinged charge port door (CPD) 36 on vehicle body 12 can be selectively opened and closed to access and cover the charge port 34, respectively.

As part of the vehicle charging process, the vehicle 10 and station 20 may individually or collaboratively monitor wired/wireless charging availability, wireless power quality, proper vehicle alignment, charge component compatibility, and other related parameters that may affect vehicle charging. According to the illustrated example, the vehicle ECU 42 of FIG. 1 communicates with and receives sensor signals from a monitoring system, which may comprise one or more onboard "resident" sensing devices 28 of the vehicle 10 and/or one or more off-board "remote" sensing devices 30 of the vehicle charging station 20. In practice, this monitoring system may include a single sensor, or it may include a distributed sensor architecture with an assortment of sensors packaged at similar or alternative locations to that shown in the drawings. A CPD sensor 38 mounted by the charge port 34 may sense and may be polled or read by the vehicle's ECU 42 to determine a door status—opened or closed—of the CPD 36. As another option, a latching button 40 that helps to physically attach and secure the electrical connector 32 to the charge port 34 may include an internal switch (e.g., an SAE S3 type switch) that functions as a sensing device to detect whether or not the electrical connector 32 is operatively connected to the charge port 34.

Propulsion of the electric-drive vehicle 10 of FIG. 1 is provided by an electrified powertrain system, which is represented in the Figures by a traction motor 16 that is powered by a rechargeable battery pack 14 through cooperative operation of the ECU 42 and TPIM 26 to drive one or more of the vehicle's road wheels 18. Traction motor 16 may be a brushless permanent magnet (PM), multiphase AC MGU that receives modulated DC electrical power generated by lithium-polymer or lithium-metal battery modules inside the chassis-mounted traction battery pack 14. The vehicle 10 may also be equipped with a distributed array of sensors, such as an in-vehicle sensor farm 52 containing one or more range sensors (e.g., RADAR), one or more detection sensors (e.g., LiDAR or ultrasonic), and/or one or more image sensors (e.g., digital camera). While shown as an all-electric powertrain architecture, the vehicle 10 may employ other FEV and HEV powertrain configurations, including P0, P1, P2.5, P3 and P4 hybrid powertrains, or may be adapted for a PHEV, range-extended hybrid vehicle, fuel-cell hybrid vehicle, other FEVs, etc.

The representative vehicle 10 of FIG. 1 is originally equipped with a vehicle telecommunications and information ("telematics") unit 54 that wirelessly communicates, e.g., via cell towers, base stations, mobile switching centers, satellite service, etc., with a remotely located or "off-board" cloud computing host service 44 (e.g., ONSTAR®). The telematics unit 54 may contain an electronic video display device 51, a microphone, one or more speaker components 53, and assorted user input controls (e.g., buttons, knobs, pedals, switches, touchpads, joysticks, touchscreens, etc.). These hardware components allow the telematics unit 54 to function, in part, as a human/machine interface (HMI) that enables a user to communicate with the telematics unit 14 and other systems, subsystems, and components resident to and remote from the vehicle 10.

As indicated above, vehicle controller 42 is constructed and programmed to govern select operations of the motor vehicle 10, including control of the components illustrated in FIG. 1. Control module, module, controller, control unit, electronic control unit, processor, microprocessor, and any permutations thereof, may be used interchangeably and synonymously to mean any one or various combinations of one or more of logic circuits, combinational logic circuit(s), Application Specific Integrated Circuit(s) (ASIC), electronic circuit(s), central processing unit(s) (e.g., microprocessor(s), semiconductor IC devices), input/output circuit(s) and devices, appropriate signal conditioning and buffer circuitry, and other components, such as a high-speed clock, to provide the described functionality, etc. Associated storage and memory 50 (e.g., read only, programmable read only, random access, hard drive, tangible, etc.), whether resident, remote or a combination of both, store processor-executable software and/or firmware programs or routines accessible by the vehicle controller 42. Software, firmware, programs, instructions, routines, code, algorithms, and similar terms may be used interchangeably and synonymously to mean any processor-executable instruction set or sets, including calibrations and look-up tables. Control routines are executed, such as by a central processing unit, and are operable to monitor inputs from sensing devices and other networked control modules, and to execute control and diagnostic routines to govern operation of devices and actuators.

When recharging the traction battery pack 14 of automobile 10, it may be desirable to provide a driver, a passenger, or any other vehicle operator (collectively "user") with live updates without requiring the user to enter, turn on, and operate the vehicle. For instance, the vehicle ECU 42 utilizes one or more sensors (e.g., electronic key fob interface, smartphone BLUETOOTH® or NFC interface, smartwatch/wearable interface, door handle sensor, vehicle assisted parking sensors, etc.) to detect when a driver is sufficiently close to the vehicle to perceive audible, visible, or tactile feedback from the vehicle 10. Once detected, the in-vehicle telematics unit 54 or speaker system displays or reads battery charging information—real-time charge status, battery percentage, battery range, preconditioning status, etc. —without requiring the driver to enter or start the vehicle. The driver may receive system-automated alerts via a "subscribed channel" (e.g., email, SMS, app, push, popup, etc.) and/or by flashing vehicle headlights/taillights if the vehicle battery charge is in a negative state (e.g., not plugged in, plugged in but not charging, error in charging, etc.). Automated presentment of charge information may be limited to when the vehicle is located within a user-selected geofenced location, e.g., in order to increase privacy. Driver alerts may also be presented on a digital instrument panel, a handheld smartphone or smart wearable device, a smart-home device, or any other suitable device.

Vehicle charge control and informational feedback may be restricted to one or more predefined locations, be it user-selected, vehicle-selected, or third-party selected sites. Each site may be typified by existing physical boundaries or user/vehicle/third-party selected virtual or physical boundaries. Moreover, charge control and informational feedback may be automated such that active user solicitation may be omitted and, if desired, dependent upon system-detected user proximity. If battery charging is in a negative state, i.e., low battery charge percentage, charger plug improperly mated, vehicle misaligned with wireless charging platform, operatively connected but not charging, detected charging fault, etc., a user may be notified by a subscribed channel and/or by flashing of the head/tail/CHIMSL/interior lights of the vehicle.

For at least some implementations, the intelligent charging system may utilize an in-vehicle thermometer, third-party weather data, historical driving data, crowdsourced data (weather, battery performance, range, other), etc., to predict how the battery is affected by current driving conditions. A user may receive an automated alert explicating how their battery will be affected by current driving conditions, including weather, road, trip, vehicle, and/or driver characteristics. Such alerts may be provided prior to a scheduled charge completion, prior to a predicted departure (e.g., using average departure times or preset by driver in settings), through remote start, and/or via a dedicated mobile app. The driver may be shown: (1) how their range is affected by predicted driving conditions (e.g., extended by ambient heat, predicted low accessory usage, predicted driving route characteristics, predicted present battery degradation, etc.); (2) the recommended manner of battery preconditioning (e.g., preconditioning may take longer/shorter depending on current battery temperature, ambient temperature, charger capacity, etc., to achieve an ideal battery temperature); and (3) how battery preconditioning may be used to improve/offset such affect(s) (e.g., expected range increase). Historical vehicle data may be aggregated on a continuous basis (e.g., life of battery pack), a rolling basis (e.g., last seven (7) days), a user-selected basis (e.g., monthly or yearly reset), etc., and may be filtered, fused, averaged, etc., to derive a predicted driving schedule, a predicted driving range, etc.

Figure 2:
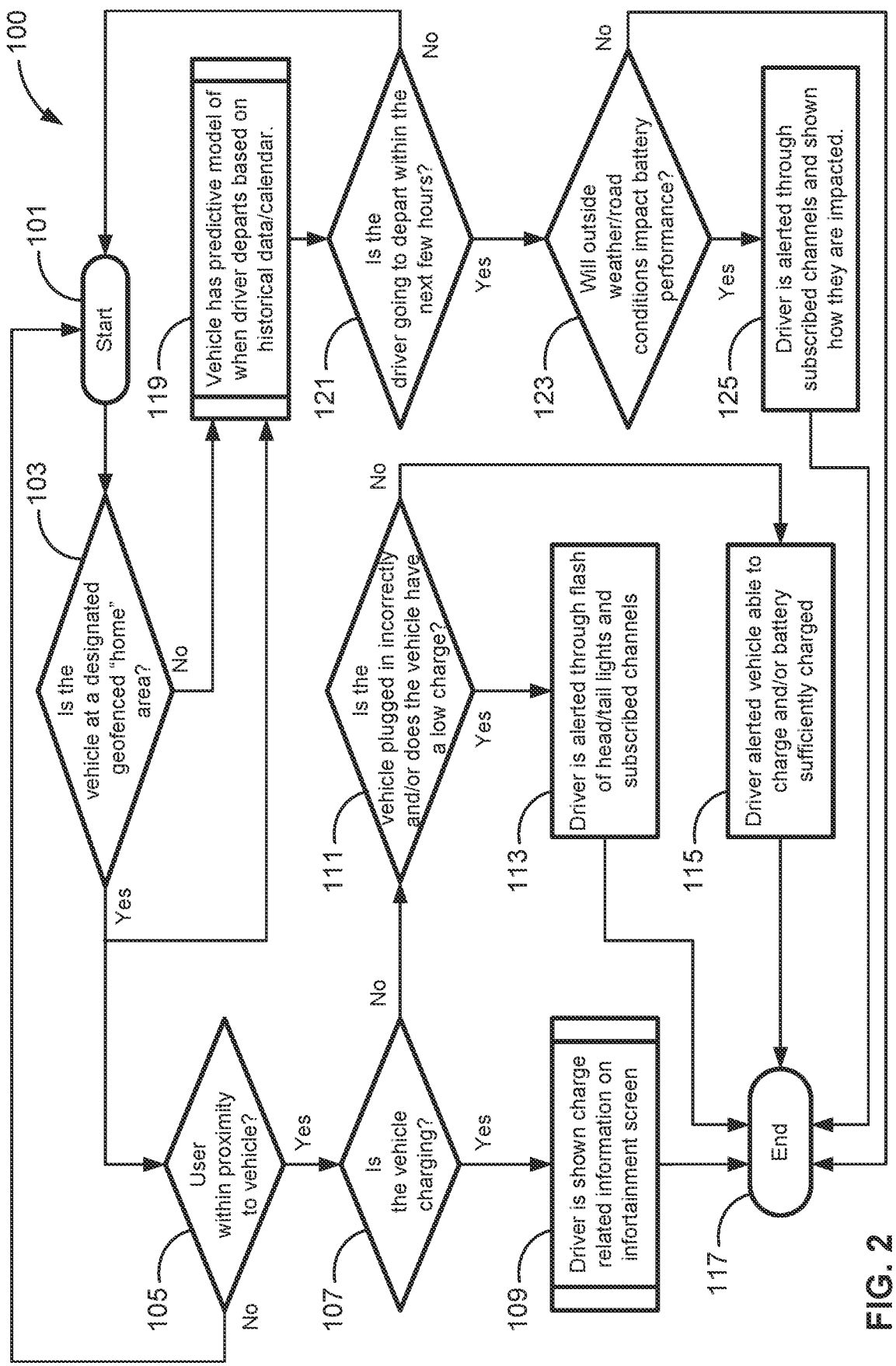
FIG. 2 is a flowchart illustrating a representative battery charging algorithm for automated charge control and information display of a vehicle battery, which may correspond to memory-stored instructions that are executable by a resident or remote controller, control-logic circuit, programmable control unit, or other integrated circuit (IC) device or network of devices in accord with aspects of the disclosed concepts.

With reference next to the flow chart of FIG. 2, an improved method or control strategy for automated monitoring, feedback, and control of a charging operation of a vehicle battery, such as battery back 14 of vehicle 10 of FIG. 1, is generally described at 100 in accordance with aspects of the present disclosure. Some or all of the operations illustrated in FIG. 2, and described in further detail below, may be representative of an algorithm that corresponds to processor-executable instructions that are stored, for example, in main or auxiliary or remote memory (e.g., memory device 50 of FIG. 1), and executed, for example, by an electronic controller, processing unit, logic circuit, or other module or device or network of modules/devices (e.g., vehicle ECU 42 and/or remote host service 44 of FIG. 1), to perform any or all of the herein-described functions associated with the disclosed concepts. It should be recognized that the order of execution of the illustrated operation blocks may be changed, additional operation blocks may be added, and some of the described operations may be modified, combined, or eliminated.

Method 100 begins at START terminal block 101 with memory-stored, processor-executable instructions for a programmable controller or control module or similarly suitable processor to call up an initialization procedure for a battery charge control algorithm. This routine may be executed in real-time, near real-time, continuously, systematically, sporadically, and/or at regular time intervals, for example, each 10 or 100 milliseconds during normal operation of a motor vehicle, such as automobile 10 of FIG. 1. As yet another option, terminal block 101 may initialize responsive to a user command prompt, a resident vehicle controller prompt, or a broadcast prompt signal received from an "off-board" centralized vehicle services system (e.g., cloud computing host service 44). In accord with the illustrated example, the vehicle 10 may be turned off in response to a vehicle stop input received from a user, for example, when the user physically keys-off the vehicle, depresses a motor start/stop button, clicks a key-fob auto start/stop button, etc. When the vehicle 10 is turned off, the ECU 42 may be placed in a temporary low-power sleep mode; ECU 42 may automatically awaken according to a periodic wake schedule to initialize terminal block 101 of method 100. Upon completion of some or all of the control operations presented in FIG. 2, the method 100 may advance to END terminal block 117 and temporarily terminate or, optionally, may loop back to terminal block 101 and run in a continuous loop.

Method 100 advances from terminal block 101 to VEHICLE TRACKING decision block 103 to determine if the host vehicle is located at a designated area. By way of explanation, and not limitation, the vehicle ECU 42 of FIG. 1 may communicate with one or more resident or remote location detection devices to collect vehicle location data that denotes a real-time location of the vehicle 10. As detailed above, the location detection device may take on an assortment of different forms, including a vehicle-mounted GPS transceiver that communicates with a satellite-based radionavigation geospatial system to gather geolocation and reference time information for the vehicle 10. Alternatively, ECU 42 may communicate with resident sensing device(s) 28, CPD sensor 38, EVCS sensing device(s) 30, sensor farm 52, etc., to ascertain real-time vehicle location data.

Once the necessary vehicle location data is received, the vehicle ECU 42 attempts to verify that the vehicle's real-time location is wholly or partially within a virtual geofence that delineates a predefined geographic area, such as the user's residential garage, workplace parking garage, etc. As noted above, the virtual geofence may be selected, created, or modified (collectively "defined") by a vehicle user (not shown), a vehicle controller (e.g., ECU 42), and/or a third-party entity (e.g., cloud host service 44), and thereafter saved in a resident or remote memory device (e.g., resident memory 50). Vehicle ECU 42 of FIG. 1, when executing decision block 103, may retrieve a user-selected virtual geofence from the resident memory device 50 and compare it with the real-time location of vehicle 10. Responsive to a determination that the host vehicle is not located within the virtual geofence (block 103=NO), method 100 may loop back to terminal block 101, may terminate at terminal block 117, or may proceed to process block 119.

After confirming that the host vehicle is located at a designated area (block 103=YES), method 100 responsively transitions to USER TRACKING decision block 105 to determine if a user is positioned sufficiently close to the host vehicle to perceive vehicle-generated audible, visible, or tactile feedback. Vehicle ECU 42 of FIG. 1, for example, may communicate with one or more resident or remote location sensing devices to collect driver location data that designates a real-time location of a driver of the vehicle 10. As previously noted, a vehicle driver may be carrying a key fob, smartphone, smartwatch, tablet computer, PDA, or wireless-enabled portable electronic device (PED). Vehicle ECU 42 may employ a vehicle-mounted fob transceiver, a short-range communication device (NFC, DSRC, BLUETOOTH, etc.), or other wireless connectivity protocol or device to communicate with the driver's key fob/PED. Optionally or alternatively, the ECU 42 may employ one or more or all of the above-described sensor devices in vehicle-mounted sensor farm 52 to detect user presence, type, location, distance, orientation, trajectory, etc. Doing so allows the location sensing device(s) to detect user presence and proximity. The ECU 42 analyzes the user's real-time location data and compares it with the vehicle's real-time location data to ascertain whether or not the user is located within a predefined proximity (e.g., approximately eight (8) to ten (10) meters) to the vehicle 10 when the vehicle 10 is parked within the driver's garage or other user-selected "geofenced" location. If not (block 105=NO), method 100 may loop back to block 101 or terminate at block 117.

Responsive to detecting a designated user within a predefined proximity to a "geofenced" host vehicle (block 105=YES), method 100 assesses if the vehicle battery is charging, as indicated at VEHICLE CHARGING decision block 107. Battery charging information, including charge status (e.g., active, inactive, complete, etc.), charge type (e.g., bulk, trickle, maintenance, etc.), charge rate (e.g., 120V/6-16A, 240V/10-80A, 480V/100-200A), charge percentage (e.g., state of charge, depth of discharge, etc.), other, may be retrieved via ECU 42 from EVCS 20, TPIM 26, or pack 14, for example. If the vehicle battery is charging (block 107=YES), method 100 advances to process block 109; if the battery is not charging (block 107=NO), method 100 advances to decision block 111.

With continuing reference to FIG. 2, CHARGE FEEDBACK process block 109 includes processor-executable instructions for actively providing one or more designated users with charge-related information. In accord with the illustrated example, the vehicle ECU 42 may transmit one or more command signals to one or more resident vehicle subsystems to execute one or more control operations related to the charging of the vehicle battery pack 14 via EVCS 20. For one option, ECU 42 may power-on and govern the touchscreen video display 51 of telematics unit 54 to display a real-time charge status, charge type, charge percentage, or other desired battery charging-related information for the pack 14 when charging on the EVCS 20. This information may be displayed in an enlarged manner to ensure that it can be easily perceived by a user standing outside of and next to the vehicle 10. Another non-limiting option may include the ECU 42 automating activation of the vehicle's horn system or lighting system (headlights/taillights 60 and 62 of FIG. 1) to output a predefined beep/acoustic pattern or flash/visual pattern that is configured to notify the driver that the charging of the battery pack 14 is or is not properly functioning. In yet another available option, an in-vehicle audio system (e.g., telematics unit 54 speakers 53 of FIG. 1) inside the passenger compartment of vehicle 10 may be controlled by ECU 42 to audibly communicate a real-time charge status, charge type, charge percentage, etc. during charging of the traction battery 14. The speaker volume may be automatically increased by the ECU 42 to ensure that this information can be heard by a user standing outside of and next to the vehicle 10. Method 100 may then advance from predefined process block 109 to terminal block 117.

Upon determining that the vehicle battery is not properly charging (block 107=NO), method 100 may responsively execute NEGATIVE CHARGE STATUS decision block 111 to determine if the battery is below a threshold (battery-calibrated minimum) charge level and the vehicle is presently unable to recharge this undercharged battery. When executing decision block 111, for example, the ECU 42 of FIG. 1 may first determine whether or not the battery pack 14 has a low charge (e.g., is at or below 15% SoC). If not, method 100 may automatically advance to process block 115. If the pack 14 is at or above its threshold minimum charge level, ECU 42 then determines if there is an EVCS charging error, there is a fault in the in-vehicle charging hardware, the vehicle is not operatively connected to the charging station to execute battery charging (e.g., charge plug 32 not properly mated with charge port 34), or there is another existing issue that is preventing the EVCS 20 from charging the battery pack 14.

If either the vehicle battery has a low charge or the vehicle is not able to charge its battery (block 111=YES), the method 100 may execute NEGATIVE STATUS ALERT process block 113 and transmit one or more (first) alerts to the user indicating there is a negative charging status. Process block 113 may include alerting the driver to a negative charging status by flashing the vehicle headlights 60 or taillights 62 and concurrently transmitting an electronic notification via one or more subscribed channels. On the other hand, if the vehicle battery is sufficiently charged or the vehicle is able to charge the battery (block 111=NO), the method 100 may execute POSITIVE STATUS ALERT process block 115 and transmit one or more (second) alerts—by any means described herein—to indicate to the user that there is a positive charging status. Method 100 thereafter advances from process block 113 or 115 to terminal block 117.

Method 100 may also monitor existing driving conditions in order to predict when and to what extent such driving conditions will affect a host vehicle's driving range. For instance, ambient temperatures may rise/drop considerably during the nighttime when many drivers charge their vehicles. Disclosed intelligent vehicle systems may monitor outside temperatures and battery-performance related factors, such as predicted trip length, predicted battery temperature or predicted battery SoC at trip inception, predicted trip accessory usage, predicted and traffic road conditions, etc., to derive a predicted impact that these expected driving conditions will have on battery performance. System-automated alerts denoting the predicted impact on battery performance may be transmitted to the driver. These alerts may be sent prior to a predicted departure time to ensure the vehicle will have enough time to precondition the battery, if needed, prior to departure.

Irrespective of whether or not the host vehicle is located at a designated site (block 103=YES/NO), method 100 may execute PREDICTIVE MODELING process block 119 to estimate a predicted departure time and/or a predicted trip range for an upcoming trip of the host vehicle. Vehicle ECU 42 of FIG. 1, for example, may prompt cloud computing host service 44 or resident memory device 50 to retrieve historical driving data for the vehicle 10 or crowdsourced driving data for multiple participating vehicles. Using machine learning techniques (e.g., deep neural network (DNN)) or intelligent system model control techniques (e.g., model predictive control (MPC)), the ECU 42 or host service 44 may estimate departure times (depending on day, month, season, etc.), trip range, daily mileage use, battery depletion, etc.

Method 100 proceeds from predefined process block 119 to PREDICTED DEPARTURE decision block 121 to determine if a user will be departing in the host vehicle within a predetermined window of time. In a non-limiting example, vehicle ECU 42 of FIG. 1 may compare the current date/time with an estimated departure date/time to determine whether or not the host vehicle 10 will be leaving within the next three (3) to five (5) hours. If not (block 121=NO), method 100 may loop back to terminal block 101 or conclude at terminal block 117.

Responsive to a determination that the user will be departing in the host vehicle within the predetermined time window (block 121=YES), method 100 will execute BATTERY IMPACT decision block 123 to determine if ambient weather and other related driving conditions will measurably impact battery performance. At this juncture, the vehicle ECU 42 and/or cloud computing service 44 may estimate a predicted impact on battery performance, if any, on a vehicle battery for related ambient driving conditions using any of the data and inputs described above. If there is no predicted impact (e.g., range reduction ~0%) or the predicted impact is relatively insignificant (e.g., range reduction <10%) (block 123=NO), method 100 may advance to terminal block 117 and temporarily terminate.

On the other hand, if the ECU 42/service 44 predicts a marked impact on battery performance (e.g., range reduction >10%) (block 123=YES), method 100 may execute IMPACT RESPONSE process block 125 and alert the driver and/or initiate a battery preconditioning protocol to precondition the vehicle batter. Process block 125 may include alerting a user that preconditioning of the vehicle battery is recommended based on the predicted departure time and the predicted impact of existing driving conditions on battery performance. As another option, vehicle ECU 42 may coordinate with EVCS 20 and regulate internal charging hardware of the vehicle 10 (e.g., TPIM 26) to precondition the vehicle battery based on the predicted departure time and predicted battery performance impact.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of operating a vehicle with a vehicle battery, the method comprising:
   receiving, via a vehicle controller from a location detection device, vehicle location data indicative of a real-time vehicle location of the vehicle;
   determining, via the vehicle controller, if the real-time vehicle location is within a virtual geofence delineating a predefined geographic area;
   receiving, via the vehicle controller from a location sensing device in response to the real-time vehicle location being within the virtual geofence, user location data indicative of a real-time user location of an authenticated user of the vehicle;
   determining, via the vehicle controller, if the real-time user location is within a predefined proximity to the real-time vehicle location;
   determining, via the vehicle controller in response to the real-time user location being within the predefined proximity to the real-time vehicle location, whether the vehicle battery is charging correctly or incorrectly;
   transmitting, via the vehicle controller responsive to the vehicle battery charging incorrectly, a notification to the authenticated user including a warning the vehicle battery is not charging correctly and a prompt to take a corrective action;
   determining, via the vehicle controller using a predictive model, a battery impact decision including predicting if the authenticated user will depart in the vehicle within a predetermined window of time and identifying driving conditions at a predicted departure time of the user determined to measurably impact battery performance of the vehicle battery; and
   transmitting, via the vehicle controller to a resident vehicle subsystem of the vehicle responsive to the vehicle battery charging correctly and based on the battery impact decision, a command signal to execute a control operation related to the charging of the vehicle battery.

2. The method of claim 1, further comprising:
   turning off the vehicle, such that the vehicle is stopped and a traction motor of the vehicle is not powered, in response to a vehicle stop input received from the authenticated user;
   switching the vehicle controller from an on mode with a first power level to a sleep mode with a second power level less than the first power level in response to the vehicle being turned off; and
   waking the vehicle controller according to a periodic wake schedule to receive the vehicle location data and determine if the real-time vehicle location is within the virtual geofence.

3. The method of claim 1, wherein the virtual geofence is defined by the authenticated user and saved in a memory device, the method further comprising retrieving, via the vehicle controller, the user-defined virtual geofence from the memory device for determining if the real-time vehicle location is within the virtual geofence.

4. The method of claim 1, further comprising:
   determining, via the vehicle controller in response to a determination that the vehicle battery is charging incorrectly, if the vehicle battery has a low charge and if the vehicle is not operatively connected to a charging station operable to carry out the charging of the vehicle battery; and
   transmitting, via the vehicle controller in response to the vehicle battery having the low charge and/or the vehicle not being operatively connected to the charging station, a first alert to the authenticated user indicating a negative charging status.

5. The method of claim 4, further comprising transmitting, via the vehicle controller in response to the vehicle battery not having the low charge and the vehicle being operatively connected to the charging station, a second alert to the authenticated user indicating a positive charging status.

6. The method of claim 1, wherein determining the battery impact decision includes:
determining the predicted departure time for the vehicle;
determining a predicted battery performance impact on the vehicle battery for ambient driving conditions; and
transmitting, via the vehicle controller to a resident battery charging system of the vehicle, a charge signal to precondition the vehicle battery based on the predicted departure time and the predicted battery performance impact.

7. The method of claim 6, further comprising transmitting, via the vehicle controller to the authenticated user of the vehicle, an alert that preconditioning of the vehicle battery is recommended based on the predicted departure time and the predicted battery performance impact.

8. The method of claim 1, wherein the authenticated user is carrying a key fob and/or a wireless-enabled portable electronic device, and wherein the location sensing device includes an in-vehicle fob transceiver and/or a short-range communication device configured to communicate with the key fob and/or the portable electronic device.

9. The method of claim 1, wherein the location sensing device includes an in-vehicle range, detection, and/or image sensor mounted to the vehicle, and wherein the user location data includes user distance data, user presence data, user proximity data, and/or user type data for the authenticated user.

10. The method of claim 1, wherein the location detection device includes a Global Positioning System (GPS) transceiver, and wherein the vehicle location data includes GPS geolocation information.

11. The method of claim 1, wherein the resident vehicle subsystem includes a telematics unit including a display device mounted inside a passenger compartment of the vehicle, and wherein the control operation includes the display device displaying a charge status, a charge type, and/or a charge percentage of the vehicle battery during the charging of the vehicle battery.

12. The method of claim 1, wherein the resident vehicle subsystem includes a vehicle horn system and/or a vehicle lighting system, and wherein the control operation includes automating activation of the vehicle horn system and/or the vehicle lighting system to output a predefined beep or flash output that the charging of the vehicle battery is properly functioning.

13. The method of claim 1, wherein the resident vehicle subsystem includes an in-vehicle audio system including a speaker device mounted inside a passenger compartment of the vehicle, and wherein the control operation includes the speaker device outputting a charge status, a charge type, and/or a charge percentage of the battery during the charging of the vehicle battery.

14. A non-transitory, computer-readable medium storing instructions executable by one or more processors of a vehicle controller of a vehicle, the vehicle including a rechargeable vehicle battery, the instructions, when executed by the one or more processors, causing the vehicle controller to perform operations comprising:
receiving, from a location detection device, vehicle location data indicative of a real-time vehicle location of the vehicle;
determining if the real-time vehicle location is within a virtual geofence delineating a predefined geographic area;
receiving, from a location sensing device in response to the real-time vehicle location being within the virtual geofence, user location data indicative of a real-time user location of an authenticated user of the vehicle;
determining if the real-time user location is within a predefined proximity to the real-time vehicle location;
determining, in response to the real-time user location being within the predefined proximity to the real-time vehicle location, whether the vehicle battery is charging correctly or incorrectly;
transmitting, responsive to the vehicle battery charging incorrectly, a notification to the authenticated user including a warning the vehicle battery is not charging correctly and a prompt to take a corrective action;
determining, using a predictive model, a battery impact decision including predicting if the authenticated user will depart in the vehicle within a predetermined window of time and identifying driving conditions determined to measurably impact battery performance of the vehicle battery; and
transmitting, to a resident vehicle subsystem of the vehicle responsive to the vehicle battery charging correctly, a command signal to execute a control operation related to the charging of the vehicle battery.

15. A motor vehicle, comprising:
a vehicle body;
a plurality of road wheels attached to the vehicle body;
a traction motor attached to the vehicle body and operable to drive one or more of the road wheels to thereby propel the motor vehicle;
a rechargeable battery pack attached to the vehicle body and electrically connected to the traction motor to supply electrical power thereto; and
a vehicle controller programmed to:
receive vehicle location data from a location detection device indicating a real-time vehicle location of the motor vehicle;
determine if the real-time vehicle location is within a virtual geofence delineating a predefined geographic area;
in response to the real-time vehicle location being within the virtual geofence, receive user location data from a location sensing device indicating a real-time user location of an authenticated user of the motor vehicle;
determine if the real-time user location is within a predefined proximity to the real-time vehicle location;
in response to the real-time user location being within the predefined proximity to the real-time vehicle location, determine whether the rechargeable battery pack is charging correctly or incorrectly;
in response to the vehicle battery charging incorrectly, transmit a notification to the authenticated user including a warning the vehicle battery is not charging correctly and a prompt to take a corrective action;
determine, using a predictive model, a battery impact decision including predicting if the authenticated user will depart in the vehicle within a predetermined window of time and identifying driving conditions determined to measurably impact battery performance of the vehicle battery; and
in response to the vehicle battery charging correctly, transmit a command signal to a resident vehicle subsystem to execute a control operation related to the charging of the rechargeable battery pack.

16. The motor vehicle of claim 15, wherein the virtual geofence is defined by the authenticated user and saved in a memory device, and wherein the vehicle controller is further programmed to retrieve the user-defined virtual geofence from the memory device to determine if the real-time vehicle location is within the virtual geofence.

17. The motor vehicle of claim 15, wherein the vehicle controller is further programmed to:
- in response to a determination that the rechargeable battery pack is charging incorrectly, determine if the rechargeable battery pack has a low charge and if the motor vehicle is not operatively connected to a charging station operable to carry out the charging of the rechargeable battery pack; and
- in response to the rechargeable battery pack having the low charge and/or the vehicle not being operatively connected to the charging station, transmit a first alert to the authenticated user indicating a negative charging status.

18. The motor vehicle of claim 17, wherein the vehicle controller is further programmed to transmit, in response to the rechargeable battery pack not having the low charge and the motor vehicle being operatively connected to the charging station, a second alert to the authenticated user indicating a positive charging status.

19. The motor vehicle of claim 15, wherein the authenticated user is carrying a key fob and/or a wireless-enabled portable electronic device, and wherein the location sensing device includes an in-vehicle fob transceiver and/or a short-range communication device attached to the vehicle body and configured to communicate with the key fob and/or the portable electronic device.

20. The motor vehicle of claim 15, wherein the location sensing device includes an in-vehicle range, detection, and/or image sensor mounted to the vehicle, and wherein the user location data includes user distance, presence, proximity, and/or type information of the authenticated user.

* * * * *